US012483824B2

(12) United States Patent
Deng et al.

(10) Patent No.: US 12,483,824 B2
(45) Date of Patent: Nov. 25, 2025

(54) VIBRATION SENSOR

(71) Applicant: SHENZHEN SHOKZ CO., LTD., Guangdong (CN)

(72) Inventors: Wenjun Deng, Shenzhen (CN); Yongshuai Yuan, Shenzhen (CN); Yujia Huang, Shenzhen (CN); Wenbing Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 291 days.

(21) Appl. No.: 18/168,585

(22) Filed: Feb. 14, 2023

(65) Prior Publication Data

US 2023/0199370 A1 Jun. 22, 2023

Related U.S. Application Data

(63) Continuation of application No. PCT/CN2021/140090, filed on Dec. 21, 2021.

(30) Foreign Application Priority Data

Dec. 28, 2020 (WO) ................ PCT/CN2020/140180
Apr. 23, 2021 (CN) ......................... 202110445739.3

(Continued)

(51) Int. Cl.
*H04R 1/28* (2006.01)
*H04R 1/04* (2006.01)

(Continued)

(52) U.S. Cl.
CPC ............. *H04R 1/2807* (2013.01); *H04R 1/04* (2013.01); *H04R 1/08* (2013.01); *H04R 1/083* (2013.01); *H04R 1/46* (2013.01)

(58) Field of Classification Search
CPC ............ H04R 2201/003; H04R 1/2807; H04R 1/083; H04R 2460/13

(Continued)

(56) References Cited

U.S. PATENT DOCUMENTS 6,075,866 A 6/2000 Frasl et al.
2010/0183181 A1* 7/2010 Wang .................... B81B 7/0061 381/361

(Continued)

FOREIGN PATENT DOCUMENTS

CN 101644718 B 8/2011
CN 202551344 U 11/2012

(Continued)

OTHER PUBLICATIONS

Decision to Grant a Patent in Japanese Application No. 2023-518843 mailed on Nov. 18, 2024, 6 pages.

(Continued)

*Primary Examiner* — Katherine A Faley
(74) *Attorney, Agent, or Firm* — METIS IP LLC

(57) ABSTRACT

The present disclosure provides a vibration sensor. The vibration sensor may include a vibration receiver and an acoustic transducer. The vibration receiver may include a housing, a limiter and a vibration unit. The housing and the acoustic transducer may form an acoustic cavity. The vibration unit may be located in the acoustic cavity to separate the acoustic cavity into a first acoustic cavity and a second acoustic cavity. The acoustic transducer may be acoustically connected to the first acoustic cavity. The housing may be configured to generate a vibration based on an external vibration signal. The vibration unit may change an acoustic pressure within the first acoustic cavity in response to the vibration of the housing, such that the acoustic transducer generates an electrical signal. The vibration unit may include (Continued)

a mass element and an elastic element. A first side of the elastic element may be connected around a side wall of the mass element. A second side of the elastic element may be connected with the limiter.

17 Claims, 9 Drawing Sheets

(30) Foreign Application Priority Data

Jul. 22, 2021 (WO) ................ PCT/CN2021/107978
Nov. 5, 2021 (WO) ................ PCT/CN2021/129148

(51) Int. Cl.
*H04R 1/08* (2006.01)
*H04R 1/46* (2006.01)

(58) Field of Classification Search
USPC ................................ 381/151, 351, 162, 344
See application file for complete search history.

(56) References Cited

U.S. PATENT DOCUMENTS

| | | | | |
|---|---|---|---|---|
| 2014/0112503 | A1 | 4/2014 | Hebenstreit | |
| 2016/0014530 | A1 | 1/2016 | Gao | |
| 2017/0347185 | A1 | 11/2017 | Kim et al. | |
| 2018/0058915 | A1* | 3/2018 | Mögelin | H04R 19/005 |
| 2020/0174033 | A1 | 6/2020 | Dubbeldeman et al. | |

FOREIGN PATENT DOCUMENTS

| | | | |
|---|---|---|---|
| CN | 104796824 | B | 3/2018 |
| CN | 108513241 | A | 9/2018 |
| CN | 208434106 | U | 1/2019 |
| CN | 209314103 | U | 8/2019 |
| CN | 110300364 | A | 10/2019 |
| CN | 110560351 | A | 12/2019 |
| CN | 110603819 | A | 12/2019 |
| CN | 209882085 | U | 12/2019 |
| CN | 210093551 | U | 2/2020 |
| CN | 210927933 | U | 7/2020 |
| CN | 210958796 | U | 7/2020 |
| CN | 211085470 | U | 7/2020 |
| CN | 111510834 | A | 8/2020 |
| CN | 111556419 | A | 8/2020 |
| CN | 211930818 | U | 11/2020 |
| CN | 211930820 | U | 11/2020 |
| CN | 211959556 | U | 11/2020 |
| CN | 212086490 | U | 12/2020 |
| CN | 212183709 | U | 12/2020 |
| EP | 3342749 | A2 | 7/2018 |
| EP | 3567872 | A1 | 11/2019 |
| JP | H03128463 | A | 5/1991 |
| JP | 2014033301 | A | 2/2014 |
| JP | 2017183859 | A | 10/2017 |
| WO | 2004068464 | A2 | 8/2004 |

OTHER PUBLICATIONS

The Extended European Search Report in European Application No. 21914041.5 mailed on Jan. 25, 2024, 9 pages.
International Search Report in PCT/CN2021/140090 mailed on Mar. 1, 2022, 8 pages.
Written Opinion in PCT/CN2021/140090 mailed on Mar. 1, 2022, 6 pages.
International Search Report in PCT/CN2020/140180 mailed on Oct. 9, 2021, 8 pages.
Written Opinion in PCT/CN2020/140180 mailed on Oct. 9, 2021, 6 pages.
International Search Report in PCT/CN2021/107978 mailed on Oct. 21, 2021, 8 pages.
Written Opinion in PCT/CN2021/107978 mailed on Oct. 21, 2021, 7 pages.
International Search Report in PCT/CN2021/129148 mailed on Jan. 27, 2022, 8 pages.
Written Opinion in PCT/CN2021/129148 mailed on Jan. 27, 2022, 8 pages.
First Office Action in Australian Application No. 2023103894 mailed on Aug. 29, 2023, 20 pages.
Notice of Preliminary Rejection in Korean Application No. 10-2023-7011152 mailed on Jun. 18, 2025, 16 pages.

* cited by examiner

VIBRATION SENSOR

CROSS-REFERENCE TO RELATED APPLICATIONS

This application is a continuation of International Application No. PCT/CN2021/140090, filed on Dec. 21, 2021, which claims priority of International Application No. PCT/CN2020/140180, filed on Dec. 28, 2020, Chinese Patent Application No. 202110445739.3, filed on Apr. 23, 2021, International Application No. PCT/CN2021/107978, filed on Jul. 22, 2021, and International Application No. PCT/CN2021/129148, filed on Nov. 5, 2021, the contents of each of which are hereby incorporated by reference.

TECHNICAL FIELD

The present disclosure relates to the technical field of acoustics, and more particularly, relates to a vibration sensor.

BACKGROUND

A vibration sensor is an energy conversion device that converts a vibration signal into an electrical signal. When the vibration sensor is used as a bone conduction microphone, it may detect a vibration signal transmitted through bones, skins, or muscles when a person speaks, so as to detect a voice signal without being disturbed by an external noise. Limited by the processing technology, a size or a shape of an elastic element in an existing vibration sensor is not easy to control, resulting in a large volume occupied by the elastic element in an acoustic cavity, which makes a volume of a mass element relatively small, resulting in a low sensitivity of the vibration sensor.

Therefore, it is desirable to provide a vibration sensor, which can limit the size of the elastic element to improve the sensitivity of the vibration sensor.

SUMMARY

Some embodiments of the present disclosure may provide a vibration sensor. The vibration sensor may include a vibration receiver and an acoustic transducer. The vibration receiver may include a housing, a limiter, and a vibration unit. The housing and the acoustic transducer may form an acoustic cavity. The vibration unit may be located in the acoustic cavity to separate the acoustic cavity into a first acoustic cavity and a second acoustic cavity. The acoustic transducer may be acoustically connected to the first acoustic cavity. The housing may be configured to generate a vibration based on an external vibration signal. The vibration unit may change an acoustic pressure within the first acoustic cavity in response to the vibration of the housing, such that the acoustic transducer generates an electrical signal. The vibration unit may include a mass element and an elastic element. A first side of the elastic element may be connected around a side wall of the mass element. A second side of the elastic element may be connected with the limiter.

In some embodiments, the limiter may be located between the housing and the acoustic transducer. The housing, the limiter, and the acoustic transducer may form the acoustic cavity.

In some embodiments, the acoustic transducer may include a substrate. The limiter may be connected with the substrate. The limiter, the vibration unit, and the substrate may form the first acoustic cavity.

In some embodiments, the elastic element may be connected between the limiter and the mass element. The elastic element and the substrate may be spaced at a certain distance in a vibration direction of the vibration unit.

In some embodiments, a thickness of the limiter along a vibration direction of the vibration unit may be greater than a thickness of the mass element along the vibration direction of the vibration unit. A side of the limiter facing away from the acoustic transducer may be flush with a side of the mass element facing away from the acoustic transducer.

In some embodiments, a width of the limiter along a direction perpendicular to a vibration direction of the vibration unit may be in a range of 100 um-500 um.

In some embodiments, the limiter may include a first limiter and a second limiter. The first limiter and the second limiter may be sequentially arranged along a vibration direction of the vibration unit. The first limiter may be connected with the housing. The second limiter may be connected with the acoustic transducer.

In some embodiments, the second side of the elastic element may be connected with the first limiter.

In some embodiments, a thickness of the first limiter along the vibration direction of the vibration unit may be equal to a thickness of the mass element along the vibration direction of the vibration unit.

In some embodiments, a width of the first limiter along a direction perpendicular to the vibration direction of the vibration unit may be less than a width of the second limiter along the direction perpendicular to the vibration direction of the vibration unit.

In some embodiments, a ratio of the width of the first limiter along the direction perpendicular to the vibration direction of the vibration unit to the width of the second limiter along the direction perpendicular to the vibration direction of the vibration unit may be greater than 0.5.

In some embodiments, a material of the first limiter may be different from a material of the second limiter.

In some embodiments, the first limiter may be made of at least one of an alloy material, a metal material, or a rigid plastic. The second limiter may be made of a solder paste or a glue.

In some embodiments, a thickness of the second limiter along the vibration direction of the vibration unit may be in a range of 50 um-500 um.

In some embodiments, the vibration unit may include a second elastic element. The second elastic element may be located in the first acoustic cavity. The second elastic element may be connected with the second limiter and the acoustic transducer, respectively.

In some embodiments, an area of a side of the second elastic element close to the acoustic transducer may be larger than an area of a side of the second elastic element away from the acoustic transducer.

In some embodiments, the elastic element may extend to the substrate and may be connected with the substrate. The elastic element, the mass element, and the substrate may form the first acoustic cavity.

In some embodiments, a thickness of the limiter along the vibration direction of the vibration unit may be equal to a thickness of the mass element along the vibration direction of the vibration unit. An area of the first side of the elastic element may be greater than an area of the second side of the elastic element.

In some embodiments, a thickness of the limiter along the vibration direction of the vibration unit may be equal to a thickness of the mass element along the vibration direction of the vibration unit. A side of the mass element facing away from the substrate may be more distant from the substrate than a side of the limiter facing away from the substrate.

In some embodiments, the mass element may include a first hole portion. The first hole portion may be connected with the first acoustic cavity and the second acoustic cavity.

In some embodiments, the housing may include a second hole portion. The second acoustic cavity may be connected with an outside through the second hole portion.

In some embodiments, the limiter may be located between the elastic element and the housing.

In some embodiments, the elastic element may extend to the acoustic transducer and may be connected with the acoustic transducer. The elastic element, the mass element, and the acoustic transducer may form the first acoustic cavity.

In some embodiments, a thickness of the limiter along a vibration direction of the vibration unit may be in a range of 100 um-1000 um.

Some embodiments of the present disclosure may also provide a vibration sensor. The vibration sensor may include a vibration receiver and an acoustic transducer. The vibration receiver may include a housing and a vibration unit. The housing and the acoustic transducer may form an acoustic cavity. The vibration unit may be located in the acoustic cavity to separate the acoustic cavity into a first acoustic cavity and a second acoustic cavity. The acoustic transducer may be acoustically connected to the first acoustic cavity. The housing may be configured to generate a vibration based on an external vibration signal. The vibration unit may change an acoustic pressure within the first acoustic cavity in response to the vibration of the housing, such that the acoustic transducer generates an electrical signal. The vibration unit may include a mass element and an elastic element. The elastic element may be connected around a side wall of the mass element and extend to the housing.

In some embodiments, a thickness of the elastic element along a vibration direction of the vibration unit may be greater than a thickness of the mass element along the vibration direction of the vibration unit.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
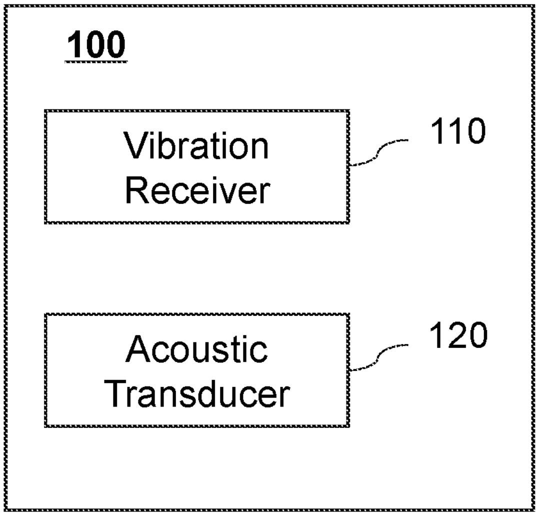
FIG. 1 is an exemplary block diagram of a vibration sensor according to some embodiments of the present disclosure.

In order to more clearly illustrate the technical solutions of the embodiments of the present disclosure, the following will briefly introduce the drawings that demand to be used in the description of the embodiments. Obviously, the drawings in the following descriptions are only some examples or embodiments of the disclosure. For those of ordinary skill in the art, without creative work, the disclosure may be applied to other similar scenarios according to these drawings. Unless it is obvious from the language environment or otherwise stated, the same reference numbers in the drawings represent the same structure or operation.

It should be understood that the terms "system," "device," "unit" and/or "module" used herein are one method to distinguish different components, elements, parts, sections or assembly of different levels. However, the terms may be displaced by another expression if they achieve the same purpose.

The terms "first," "second" and similar words used in the present disclosure and claims are only used to distinguish different components, and do not indicate any order, quantity or importance. Likewise, the terms such as "a" or "an" do not denote a limitation in quantity, but indicate that there is at least one. Unless otherwise indicated, the terms such as "front," "rear," "lower," and/or "upper" are used for convenience of description only and are not intended to limited to a position or an orientation in a space. Generally speaking, the terms "comprises" and "includes" only specify the presence of stated operations and elements, but these operations and elements do not constitute an exclusive list, and the method or the device may also include other operations or elements.

The embodiments of the present disclosure describes a vibration sensor. In some embodiments, the vibration sensor may include a vibration receiver and an acoustic transducer. In some embodiments, the vibration receiver may include a housing, a limiter and a vibration unit. The housing may be connected with the limiter to form an acoustic cavity. The vibration unit may be located in the acoustic cavity to separate the acoustic cavity into a first acoustic cavity and a second acoustic cavity. The acoustic transducer may be acoustically connected to the first acoustic cavity. In some embodiments, the housing may generate a vibration based on an external vibration signal (e.g., a signal generated by a vibration of a bone, a skin, etc. when a user speaks), and the vibration unit may change the acoustic pressure within the first acoustic cavity in response to the vibration of the housing, such that the acoustic transducer may generate an electrical signal.

In some embodiments, the vibration unit may include a mass element and an elastic element. A first side of the elastic element may be connected around a side wall of the mass element, and a second side of the elastic element may be connected with the limiter, such that the elastic element may be connected between the mass element and the limiter. The first side of the elastic element may be a side of the elastic element extend to the mass element. The second side of the elastic element may be a side opposite to the first side of the elastic element, and the second side of the elastic element may extend to the limiter. In some embodiments, the limiter may be located between the housing and the acoustic transducer. In some embodiments, the limiter may be located between the elastic element and the housing. In some embodiments of the present disclosure, by arranging the limiter in the vibration receiver of the vibration sensor, the limiter may be configured to limit the elastic element to control a flow of the elastic element during the preparation of the vibration receiver, thereby facilitating the control of the size and/or the shape of the elastic element, to adjust (e.g., increase) the size or the volume of the mass element, and improve the sensitivity of the vibration sensor.

In some embodiments, the vibration receiver may include the housing and the vibration unit. The vibration unit may include the mass element and the elastic element. The elastic element may be connected around the side wall of the mass element, and may extend to the housing.

FIG. 1 is an exemplary block diagram of a vibration sensor according to some embodiments of the present disclosure.

As shown in FIG. 1, the vibration sensor 100 may include a vibration receiver 110 and an acoustic transducer 120. In some embodiments, the vibration receiver 110 and the acoustic transducer 120 may be connected via a physical connection manner. The physical connection manner in the present disclosure may include a welding connection, a clamping connection, a glue connection, an integrated molding, or the like, or any combination thereof.

In some embodiments, the vibration sensor 100 may be configured as a bone conduction microphone. When the vibration sensor is configured as the bone conduction microphone, the vibration sensor 100 may receive a vibration signal of tissues such as a bone and a skin generated when a user speaks, and convert the vibration signal into an electrical signal including sound information. Since a sound (or a vibration) in the air is almost not collected, the vibration sensor 100 may be immune to an influence of a noise in a surrounding environment (e.g., a noise of other people, a noise generated by a vehicle in the surrounding environment) to a certain extent, and the vibration sensor 100 may be suitable for use in a noisy environment to capture a sound signal when the user speaks. In some embodiments, the vibration sensor 100 may be applied to an earphone (e.g., an air conduction earphone and a bone conduction earphone), a hearing aid, an auxiliary hearing aid, a glass, a helmet, an augmented reality (AR) device, a virtual reality (VR) device, or the like, or any combination thereof. For example, the vibration sensor 100 may be applied to the earphone as the bone conduction microphone.

The vibration receiver 110 may be configured to receive and transmit a vibration signal. In some embodiments, the vibration receiver 110 may include a housing and a vibration unit. In some embodiments, the vibration receiver 110 may further include a limiter. In some embodiments, the limiter may be located between the housing and the acoustic transducer 120. The vibration receiver 110 may be connected to the acoustic transducer 120 through the limiter. In some embodiments, the housing may have a hollow structure. The housing, the limiter, and the acoustic transducer 120 may be connected with each other to form an acoustic cavity. Some components (e.g., the vibration unit) of the vibration sensor 100 may be located in the acoustic cavity. In some embodiments, the vibration unit may be located in the acoustic cavity. The vibration unit (e.g., the elastic element and the mass element) may be connected with the limiter to separate the acoustic cavity into a first acoustic cavity and a second acoustic cavity. The first acoustic cavity may be acoustically connected to the acoustic transducer 120. An acoustic connection may be a connection that can transmit an acoustic pressure, a sound wave, or a vibration signal.

In some embodiments, the limiter may be located between the vibration unit (e.g., the elastic element) and the housing. The elastic element may extend to the acoustic transducer and may be connected with the acoustic transducer 120. The vibration unit (e.g., the elastic element and the mass element) and the acoustic transducer 120 may form the first acoustic cavity.

The acoustic transducer 120 may generate an electrical signal including sound information based on a change of an acoustic pressure in the first acoustic cavity. In some embodiments, the vibration signal may be received by the vibration receiver 110 and an internal air pressure of the first acoustic cavity may be changed. The acoustic transducer 120 may generate an electrical signal based on the change of the internal air pressure of the first acoustic cavity. In some embodiments, when the vibration sensor 100 works, the housing may vibrate based on an external vibration signal (e.g., a signal generated by a vibration of a bone, a skin, etc. when a user speaks). The vibration unit may vibrate in response to the vibration of the housing through the limiter, and transmit the vibration to the acoustic transducer 120 through the first acoustic cavity. In some embodiments, the acoustic transducer 120 may generate the vibration based on the external vibration signal, and transmit the vibration signal to the vibration unit. In some embodiments, the acoustic transducer 120 may generate the vibration based on the external vibration signal. The vibration unit may vibrate in response to the vibration of the acoustic transducer 120 through the limiter or the housing connected to the acoustic transducer 120. For example, the vibration of the vibration unit may cause a change of a volume of the first acoustic cavity, thereby causing a change of an air pressure in the first acoustic cavity. The change of the air pressure in the first acoustic cavity may be converted into a change of an acoustic pressure. The acoustic transducer 120 may detect the change of the acoustic pressure in the first acoustic cavity, and generate an electrical signal based the change of the acoustic pressure in the first acoustic cavity. For example, the acoustic transducer 120 may include a diaphragm. The acoustic pressure within the first acoustic cavity may be changed and acted on the diaphragm, which may cause the diaphragm to vibrate (or deform). The acoustic transducer 120 may convert the vibration of the diaphragm into the electrical signal. More descriptions for the vibration sensor 100 may be found in FIGS. 2-9 and descriptions thereof.

It should be noted that the above descriptions about the vibration sensor 100 and its components are only for illustration and description, and do not limit the scope of the present disclosure. For those skilled in the art, various modifications and changes may be made to the vibration sensor 100 under the guidance of the present disclosure. In some embodiments, the vibration sensor 100 may further include other components. For example, a power supply may be configured to provide an electrical energy to the acoustic transducer 120, or the like. These modifications and changes are still within the scope of the present disclosure.

Figure 2:
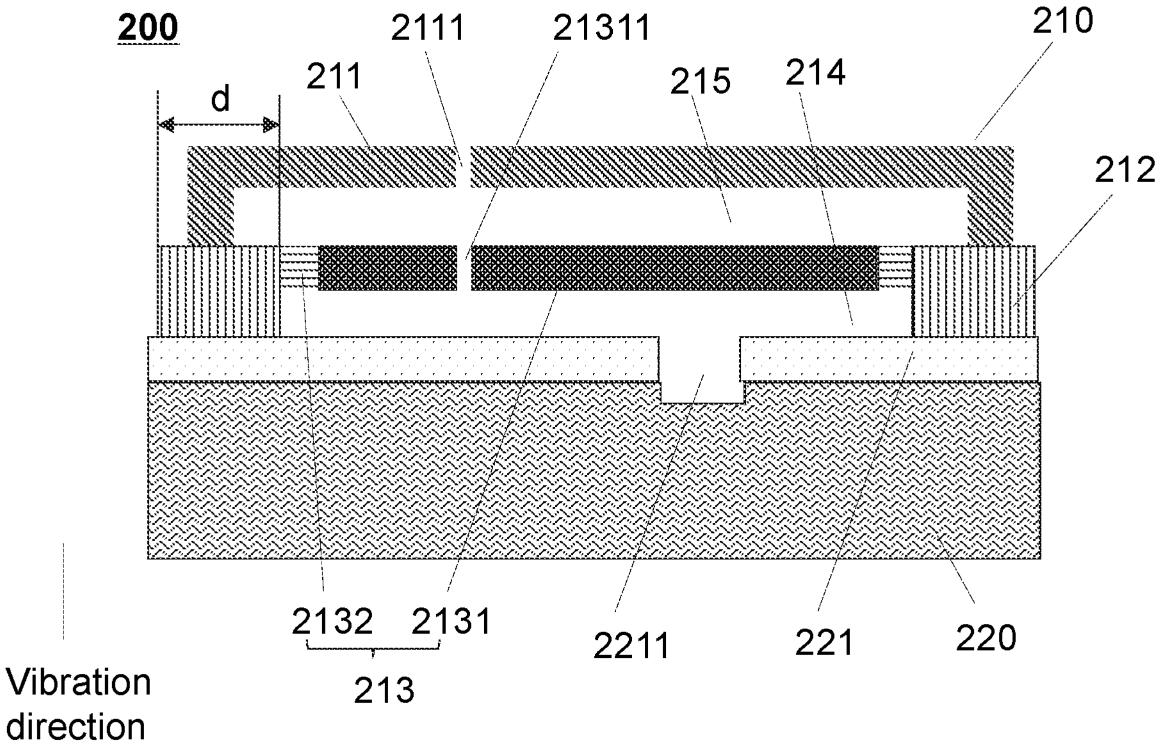
FIG. 2 is an exemplary structural diagram of a vibration sensor according to some embodiments of the present disclosure.

FIG. 2 is an exemplary structural diagram of a vibration sensor according to some embodiments of the present disclosure.

As shown in FIG. 2, a vibration sensor 200 may include a vibration receiver 210 and an acoustic transducer 220. In some embodiments, the vibration receiver 210 may include a housing 211, a limiter 212, and a vibration unit 213. The limiter 212 may be located between the housing 211 and the acoustic transducer 220. The vibration receiver 210 may be connected to the acoustic transducer 220 through the limiter 212.

In some embodiments, the housing 211 may have a hollow structure. The housing 211 may be connected with the acoustic transducer 220 through the limiter 212 to form an acoustic cavity. In some embodiments, the vibration unit 213 may be located in the acoustic cavity. The vibration unit 213 may be connected with the limiter 212 to separate the acoustic cavity into a first acoustic cavity 214 and a second acoustic cavity 215. In some embodiments, the limiter 212 may be connected to a substrate 221 of the acoustic transducer 220, such that the vibration unit 213, the limiter 212, and the substrate 221 may form the first acoustic cavity 214. The limiter 212 may be connected to the housing 211, such that the vibration unit 213, the limiter 212, and the housing 211 may form the second acoustic cavity 215. In some embodiments, a shape of the housing 211 may have a regular or an irregular three-dimensional structure, for example, a cuboid, a cylinder, or a circular truncated cone. In some embodiments, a material of the housing 211 may include a metal (e.g., copper, iron, aluminum), an alloy (e.g., a stainless steel), a plastic, or the like, or any combination thereof. In some embodiments, the housing 211 may have a certain thickness to ensure sufficient strength, so as to protect components (e.g., the vibration unit 213) of the vibration sensor 100 arranged in the housing 211.

The vibration sensor 200 may convert an external vibration signal into an electrical signal. Merely by way of example, the external vibration signal may include a vibration signal when a person speaks, a vibration signal generated by the skin when a human body moves or when other devices close to the skin works, and a vibration signal generated by an object or the air in contact with the vibration sensor 200, or the like, or any combination thereof. When the vibration sensor 200 works, the housing 211 may vibrate in response to the external vibration signal. The vibration of the housing 211 may be transmitted to the vibration unit 213 through the limiter 212. The vibration unit 213 may vibrate in response to the vibration of the housing 211. The vibration of the vibration unit 213 may cause a change of a volume of the first acoustic cavity 214, thereby causing a change of the air pressure in the first acoustic cavity 214. The change of the air pressure in the cavity may be converted into the change of the acoustic pressure in the cavity. The acoustic transducer 220 may be acoustically connected to the first acoustic cavity 214 to detect the change of the acoustic pressure in the first acoustic cavity 214, and convert the change of the acoustic pressure into the electrical signal. For example, the acoustic transducer 220 may include a sound pickup hole 2211. The change of the acoustic pressure in the first acoustic cavity 214 may be acted on a diaphragm of the acoustic transducer 220 through the sound pickup hole 2211, such that the diaphragm may vibrate (or deform) to generate the electrical signal. In some embodiments, the sound pickup hole 2211 may be located on the substrate 221 of the acoustic transducer 220. The sound pickup hole 2211 may penetrate the substrate 221 along the vibration direction of the vibration unit 213. Further, the electrical signal generated by the acoustic transducer 220 may be transmitted to an external electronic device. Merely by way of example, the acoustic transducer 220 may include an interface (not shown in figures). The interface may be connected to an internal element (e.g., a processor) of the external electronic device via a wired connection (e.g., an electric connection) or a wireless connection. The electrical signal generated by the acoustic transducer 220 may be transmitted to the external electronic device through the interface via the wired connection or the wireless connection. In some embodiments, the external electronic device may include a mobile device, a wearable device, a virtual reality device, an augmented reality device, or the like, or any combination thereof. In some embodiments, the mobile device may include a smartphone, a tablet computer, a personal digital assistant (PDA), a gaming device, a navigation device, or the like, or any combination thereof. In some embodiments, the wearable device may include a smart bracelet, an earphone, a hearing aid, a smart helmet, a smart watch, a smart clothing, a smart backpack, a smart accessory, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololen, a Gear VR, etc.

In some embodiments, the acoustic transducer 220 may include the substrate 221. The substrate 221 may be configured to fix and/or support the vibration receiver 210. In some embodiments, the substrate 221 may be arranged on the acoustic transducer 220. The housing 211 may be connected to the substrate 221 through the limiter 212 to form the acoustic cavity. In some embodiments, a material of the substrate 221 may include a metal (e.g., iron, copper), an alloy (e.g., a stainless steel), a non-metal (a plastic, a rubber, a resin), or the like, or any combination thereof. In some embodiments, by arranging the substrate 221, the vibration receiver 210 can be processed, produced, and sold as an independent component. The acoustic transducer 220 with the substrate 221 may be directly connected with the vibration receiver 210 via a physical connection (e.g., a glue connection), to obtain the vibration sensor 200, which may simplify a production process of the vibration sensor 200, and improve a process flexibility of the production of the vibration sensor 200. In some embodiments, a thickness of the substrate 221 may be in a range of 10 um-300 um. For example, the thickness of the substrate 221 may be in a range of 80 um-90 um.

In some embodiments, the vibration unit 213 may include a mass element 2131 and an elastic element 2132. A first side of the elastic element 2132 may be connected around a side wall of the mass element 2131. A second side of the elastic element 2132 may be connected to the limiter 212. The first side of the elastic element 2132 may be a side of the elastic element 2132 close to the mass element 2131. The second side of the elastic element 2132 may be a side opposite to the first side of the elastic element 2132. That is, the second side of the elastic element 2132 may be the side of the elastic element 2132 close to the limiter 212. For example, the elastic element 2132 may have a ring structure. The first side of the elastic element 2132 may be an inner ring side of the ring structure. The second side of the elastic element 2132 may be an outer ring side of the ring structure. The first side and the second side of the elastic element 2132 may be arranged along a direction perpendicular to the vibration direction of the vibration unit 213. In some embodiments, the elastic element 2132 may be connected to the mass element 2131 and/or the limiter 212 via a physical connection, for example, a glue connection. Merely by way of example, the elastic element 2132 may be made of a material (e.g., a glue) with a good viscosity, such that the elastic element 2132 may be directly bonded to the mass element 2131 and/or the limiter 212.

In some embodiments, the elastic element 2132 may be made of a high temperature resistant material, such that the elastic element 2132 may maintain the performance during a preparation process of the vibration sensor 200. In some embodiments, when the elastic element 2132 is in an environment of 200° C.-300° C., Young's modulus and shear modulus of the elastic element 2132 may not be changed or the change may be relatively small (e.g., the change may be within 5%). The Young's modulus may be used to characterize a deformability of the elastic element 2132 when it is stretched or compressed. The shear modulus may be used to characterize the deformability of the elastic element 2132 when it is sheared. In some embodiments, the elastic element 2132 may be made of a material with a good elasticity (i.e., prone to elastic deformation), such that the vibration unit 213 may vibrate in response to the vibration of the housing 211. Merely by way of example, the material of the elastic element 2132 may include a silicon rubber, a silicon gel, a silicone glue, a silicon sealant, or the like, or any combination thereof. In order to make the elastic element 2132 have a relatively good elasticity, in some embodiments, a shore hardness of the elastic element 2132 may be less than 50 HA. For example, the shore hardness of the elastic element 2132 may be in a range of 5 HA-50 HA.

In some embodiments, a density of the material of the mass element 2131 may be greater than a certain density threshold (e.g., 6 g/cm). For example, the material of the mass element 2131 may include a metal or an alloy, such as lead, copper, silver, tin, a stainless steel, a stainless iron, or the like, or any combination thereof. In the case of the same mass, the higher the density of the material of the mass element 2131, the smaller the size of the mass element 2131. Therefore, the mass element 2131 may be made of a material with a density greater than the certain density threshold, which may reduce the size of the vibration sensor 200 to a certain extent. In some embodiments, the density of the material of the mass element 2131 may have a great influence on a resonant peak and a sensitivity of a frequency response curve of the vibration sensor 200. In the case of the same volume, the greater the density of the mass element 2131, the greater the mass of the mass element 2131, and the resonant peak of the vibration sensor 200 may move to a low frequency. By increasing the mass of the mass element 2131, the sensitivity of the vibration sensor 200 in a relatively low frequency band (e.g., 20 Hz-6000 Hz) may be improved. In some embodiments, the density of the material of the mass element 2131 may be greater than 6 g/cm3. For example, the density of the material of the mass element 2131 may be in a range of 7-20 g/cm$^3$. In some embodiments, the mass element 2131 and the elastic element 2132 may be made of different materials. The mass element 2131 and the elastic element 2132 may be assembled (e.g., glued) together to form the vibration unit 213. In some embodiments, the mass element 2131 and the elastic element 2132 may be made of the same material. The vibration unit 213 may be formed by the integrated molding. In some embodiments, a thickness of the mass element 2131 along the vibration direction of the mass element 2131 may be in a range of 60 um-1150 um. For example, the thickness of the mass element 2131 along the vibration direction of the mass element 2131 may be in a range of 140 um-200 um.

In some embodiments, the elastic element 2132 and the substrate 221 of the acoustic transducer 220 may be spaced at a certain distance in the vibration direction of the vibration unit 213. By arranging the elastic element 2132 not in contact with the substrate 221, the preparation process of the vibration sensor 200 may be easily. In some embodiments, the vibration sensor 200 may be prepared by a separate preparation method. For example, the vibration receiver 210 and the acoustic transducer 220 may be prepared separately. Then the vibration receiver 210 and the acoustic transducer 220 may be physically connected (e.g., welded, glued) to obtain the vibration sensor 200. In some embodiments, a distance between the elastic element 2132 and the substrate 221 in the vibration direction of the vibration unit 213 may be determined based on a requirement of the vibration sensor 200, for example, a height of the first acoustic cavity 214 along the vibration direction of the vibration unit 213, which is not limited here.

In some embodiments, the mass element 2131 may further include a first hole portion 21311. The first hole portion 21311 may communicate with the first acoustic cavity 214 and the second acoustic cavity 215. The first hole portion 21311 may pass through the mass element 2131. The first hole portion 21311 may allow the gas in the first acoustic cavity 214 and the second acoustic cavity 215 to flow, so as to balance the change of the air pressure in the first acoustic cavity 214 and the second acoustic cavity 215 caused by the temperature change during the preparation process (e.g., during the reflow welding) of the vibration sensor 200, and reduce or prevent the damage to the components of the vibration sensor 200 caused by the change of the air pressure, for example, cracking, deformation, etc.

In some embodiments, the first hole portion 21311 may have a single hole structure. In some embodiments, a diameter of a single hole may be in a range of 1 um-50 um. For example, the diameter of the single hole may be in a range of 7 um-10 um. In some embodiments, the first hole portion 21311 may be an array including a certain number of micropores. Merely by way of example, a count of micropores may be in a range of 2-10. In some embodiments, the diameter of each micropore may be in a range of 0.1 um-25 um. For example, the diameter of each micropore may be 20 um.

In some embodiments, the mass element 2131 may not be provided with the first hole portion 21311. In some embodiments, when the mass element 2131 is not provided with the first hole portion 21311, the components of the vibration sensor 200 may be prevented from being damaged due to the change of the air pressure inside the first acoustic cavity 214 by improving a connection strength between the mass element 2131 and the elastic element 2132 (e.g., by increasing the adhesive strength of the glue between the mass element 2131 and the elastic element 2132).

In some embodiments, at least one second hole portion 2111 may be arranged on the housing 211. The second hole portion 2111 may pass through the housing 211. The structure of the second hole portion 2111 may be the same as or similar to the structure of the first hole portion 21311. The second hole portion 2111 may allow the second acoustic cavity 215 to communicate with the air of the outside, so as to balance the change of the air pressure inside the second acoustic cavity 215 caused by the temperature change during the preparation process of the vibration sensor 200, and reduce or prevent the damage to the components of the vibration sensor 200 caused by the change of the air pressure, for example, cracking, deformation, etc. In addition, when the mass element 2131 vibrates, the second hole portion 2111 may be configured to reduce a damping generated by the gas inside the second acoustic cavity 215.

In some embodiments, an air conduction sound in the environment may affect the performance of the vibration sensor 200. In order to reduce the influence of the air conduction sound in the environment, after the vibration sensor 200 is prepared, for example, after the reflow soldering, a sealing material may be used to seal the second hole portion 2111 on the housing 211. Merely by way of example, the sealing material may include an epoxy glue, a silicon sealant, or the like. or any combination thereof. In some embodiments, the housing 211 may not be provided with the second hole portion 2111.

In some embodiments, the first side of the elastic element 2132 may be connected around a peripheral side surface of the mass element 2131. For example, when the mass element 2131 has a columnar structure (a cylinder or a prism), the peripheral side surface of the mass element 2131 may be a side surface of the columnar structure. In some embodiments, the second side of the elastic element 2132 may be connected around an inner wall of the limiter 212, such that projections of the mass element 2131, the elastic element 2132, and the limiter 212 along the vibration direction of the vibration unit 213 are arranged sequentially from inside to outside. In some embodiments, the projection of the mass element 2131 along the vibration direction of the vibration unit 213 may have a regular and/or an irregular polygon shape, such as a circle, a rectangle, a pentagon, a hexagon, or the like. The projections of the elastic element 2132 and the limiter 212 along the vibration direction of the vibration unit 213 may have a regular and/or an irregular polygon ring shape, such as a circle ring, a rectangular ring, a pentagonal ring, a hexagonal ring, or the like, corresponding to the regular and/or an irregular polygon shape, such as a circle, a rectangle, a pentagon, a hexagon, or the like. In some embodiments, the elastic element 2132 may be in close contact with surrounding surfaces of the mass element 2131 and/or the limiter 212, which may ensure the sealing of the first acoustic cavity 214, such that the change of the air pressure of the first acoustic cavity 214 may only be related to a vibration amplitude of the vibration unit 213, thus making the change of the acoustic pressure in the first acoustic cavity 214 obvious and effective.

In some embodiments, the structure of the elastic element 2132 may be a single-layer structure, a double-layer structure, a multi-layer structure, or the like. The size and the material of each layer of the double-layer structure or the multi-layer structure of the elastic element 2132 may be the same or different. The structure of the elastic element 2132 may be reasonably determined based on the preparation process of the vibration sensor 200, which is not limited in the present disclosure.

In some embodiments, due to the influence of a material type of the elastic element 2132, for example, a glue material, in the preparation process of the vibration sensor 200, the elastic element 2132 may be in a semi-fluid state, or the elastic element 2132 may be easily deformed in a high temperature process, making it difficult to control the size and the shape of the elastic element 2132. Therefore, if no limiter is provided, the size of the mass element 2131 may need to be reduced, so as to ensure that the elastic element 2132 does not flow to the outside of the housing 211, thereby avoiding affecting the connection between the housing 211 and the substrate 211 in a subsequent process. By arranging the limiter 212 on the vibration sensor 200, the size of the elastic element 2132 may be controlled. For example, in the preparation process of the vibration sensor 200, the limiter 212 and the mass element 2131 may be fixed, and then the elastic element 2132 may be filled into a gap between the limiter 212 and the mass element 2131. Therefore, the size of the elastic element 2132 may be controlled, the extension of the elastic element 2132 along the direction perpendicular to the vibration direction of the vibration unit 213 may be avoided, a margin for an increase of the size of the mass element 2131 may be provided, and the performance of the vibration sensor 200 may be improved. For example, the sensitivity of the vibration sensor 200 may be improved.

In some embodiments, the limiter 212 may be located between the housing 211 and the acoustic transducer 220. The housing 211 may be connected to the acoustic transducer 220 through the limiter 212. When an overall size of the vibration sensor 200 and the size of the limiter 212 are fixed, compared with arranging the limiter 212 inside the housing 211, arranging the limiter 212 between the housing 211 and the acoustic transducer 220 may reduce a volume of the acoustic cavity occupied by the limiter 212, thereby increasing the volume of the mass element 2131 (e.g., increasing a width of the mass element 2131 along the direction perpendicular to the vibration direction of the vibration unit 213). The sensitivity of the vibration sensor 200 may be improved.

In some embodiments, the limiter 212 may be made of a rigid material to ensure that the limiter 212 has a sufficient strength. In some embodiments, the rigid material may include, but is not limited to, a metal material (e.g., copper, iron, aluminum), an alloy material (e.g., a stainless steel), a rigid plastic, or the like. For example, the brass material may be used to prepare the limiter 212 to facilitate the welding between the limiter 212 and the substrate 221. As another example, the stainless steel may be used to prepare the limiter 212 to ensure that the limiter 212 has a relatively high strength. Therefore, the reliability of the structure of the limiter 212 may be ensured. In some embodiments, the limiter 212 may be made of a non-magnetic conductive metal.

In some embodiments, when other parameters (e.g., the material) of the limiter 212 are fixed, the width of the limiter 212 along the direction perpendicular to vibration direction of the vibration unit 213 may affect the strength of the limiter 212. For example, when the other parameters (e.g., the material) of the limiter 212 are fixed, the smaller the width of the limiter 212 along the direction perpendicular to the vibration direction of the vibration unit 213 (the width "d" of the limiter 212 as shown in FIG. 2), the lower the strength of the limiter 212. Therefore, the width "d" of the limiter 212 along the direction perpendicular to the vibration direction of the vibration unit 213 may need to be greater than a first width threshold (e.g., 100 um), so as to ensure that the limiter 212 has the sufficient strength. In some embodiments, the width "d" of the limiter 212 along the direction perpendicular to the vibration direction of the vibration unit 213 may be greater than 100 um.

In some embodiments, when the overall size of the vibration sensor 200 is fixed, the width "d" of the limiter 212 along the direction perpendicular to the vibration direction of the vibration unit 213 may affect the width of the mass element 2131 along the direction perpendicular to vibration direction of the vibration unit 213. For example, when the overall size of the vibration sensor 200 is fixed, the larger the width "d" of the limiter 212 along the direction perpendicular to the vibration direction of the vibration unit 213, the smaller the width of the mass element 2131 along the direction perpendicular to the vibration direction of the vibration unit 213, and the lower the sensitivity of the vibration sensor 200. Therefore, the width "d" of the limiter 212 along the direction perpendicular to the vibration direction of the vibration unit 213 may need to be less than a second width threshold (e.g., 500 um), so as to ensure that the mass element 2131 has an appropriate size, thereby ensuring that the vibration sensor 200 has a high sensitivity. In some embodiments, the width "d" of the limiter 212 along the direction perpendicular to the vibration direction of the vibration unit 213 may be less than 500 um. For example, the width "d" of the limiter 212 along the direction perpendicular to the vibration direction of the vibration unit 213 may be less than 300 um. As another example, the width "d" of the limiter 212 along the direction perpendicular to the vibration direction of the vibration unit 213 may be less than 200 um.

In some embodiments, the first width threshold and/or the second width threshold may be determined based on the strength of the material of the limiter 212, the overall size requirement of the vibration sensor 200, and/or the performance requirement of the vibration sensor 200. In some embodiments, the width "d" of the limiter 212 along the direction perpendicular to the vibration direction of the vibration unit 213 may be in a range of 100 um-500 um. For example, the width "d" of the limiter 212 along the direction perpendicular to the vibration direction of the vibration unit 213 may be in a range of 100 um-200 um.

In some embodiments, in the preparation process of the vibration sensor 200, the height of the first acoustic cavity 214 along the vibration direction of the vibration unit 213 may be controlled by setting the thickness of the limiter 212 and the thickness of the mass element 2131 along the vibration direction of the vibration unit 213. In some embodiments, the thickness of the limiter 212 along the vibration direction of the vibration unit 213 may be greater than the thickness of the mass element 2131 along the vibration direction of the vibration unit 213. The side of the mass element 2131 facing away from the substrate 221 may be flush with the side of the limiter 212 facing away from the substrate 221. A difference between the thickness of the limiter 212 along the vibration direction of the vibration unit 213 and the thickness of the mass element 2131 along the vibration direction of the vibration unit 213 may be the height of the first acoustic cavity 214 along the vibration direction of the vibration unit 213. Therefore, when preparing the vibration sensor 200, the height of the first acoustic cavity 214 along the vibration direction of the vibration unit 213 may be limited by setting the thickness of the limiter 212 along the vibration direction of the vibration unit 213 and the thickness of the mass element 2131 along the vibration direction of the vibration unit 213, such that the control of the height of the first acoustic cavity 214 along the vibration direction of the vibration unit 213 may be precise.

It should be noted that the above descriptions about the vibration sensor 200 and its components are only for illustration and description, and do not limit the scope of the present disclosure. For those skilled in the art, various modifications and changes may be made to the vibration sensor 200 under the guidance of the present disclosure. For example, the first hole portion 21311 may pass through the elastic element 2132. These modifications and changes are still within the scope of the present disclosure.

Figure 3:
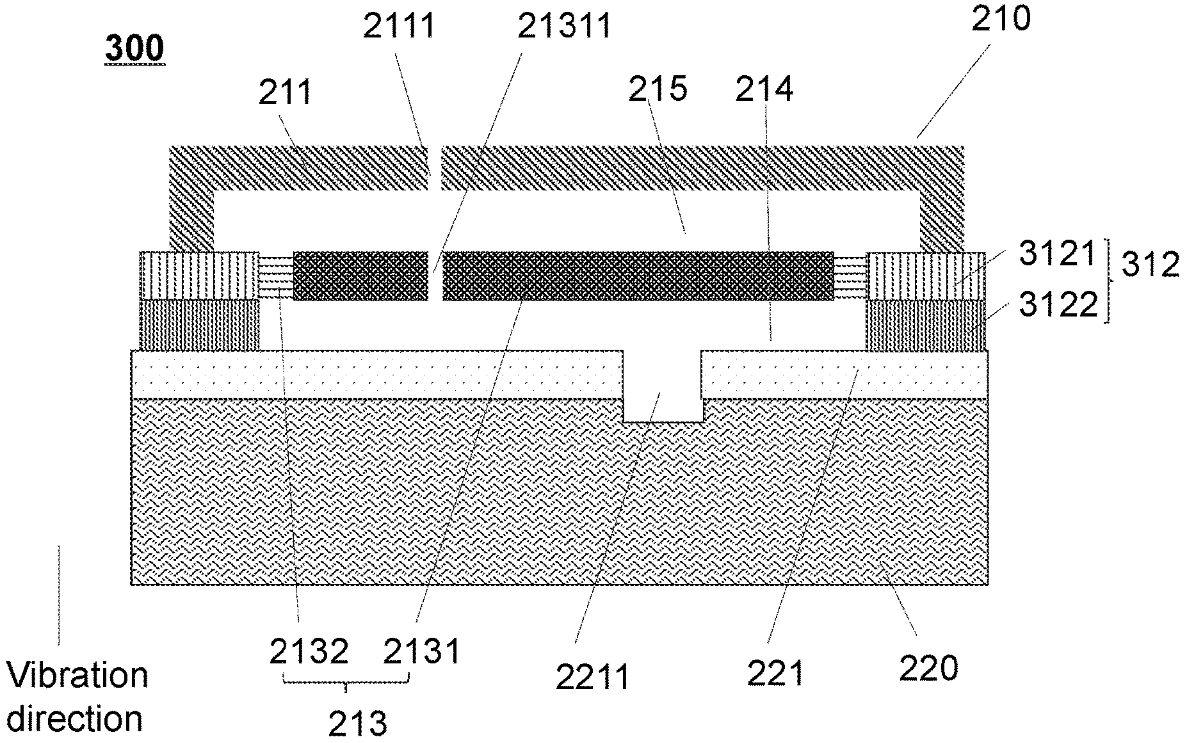
FIG. 3 is an exemplary structural diagram of a vibration sensor according to some embodiments of the present disclosure.

FIG. 3 is an exemplary structural diagram of a vibration sensor according to some embodiments of the present disclosure.

The structure of the vibration sensor 300 shown in FIG. 3 may be similar to the structure of the vibration sensor 200 shown in FIG. 2, the difference may be that the structure of the limiter is different. As shown in FIG. 3, a limiter 312 of a vibration sensor 300 may include a first limiter 3121 and a second limiter 3122. The first limiter 3121 and the second limiter 3122 may be sequentially arranged along a vibration direction of the vibration unit 213. The first limiter 3121 may be connected to the housing 211. The second limiter 3122 may be connected to the acoustic transducer 220 (e.g., the substrate 221). That is, the housing 211, the first limiter 3121, the second limiter 3122, and the acoustic transducer 220 (e.g., the substrate 221) may be sequentially connected along the vibration direction of the vibration unit 213. In some embodiments, a first side of the elastic element 2132 may be connected to a peripheral side of the mass element 2131. A second side of the elastic element 2132 may be connected to the first limiter 3121. That is, the elastic element 2132 may be connected between the mass element 2131 and the first limiters 3121. The elastic element 2132 and the substrate 221 may be spaced at a certain distance in the vibration direction of the vibration unit 213.

In some embodiments, a thickness of the first limiter 3121 along the vibration direction of the vibration unit 213 may be equal to a thickness of the mass element 2131 along the vibration direction of the vibration unit 213. In some embodiments, the first limiter 3121 and the mass element 2131 may be made of a same material. In this case, the first limiter 3121 and the mass element 2131 may be processed at the same time, thereby reducing the processing flow and making the production process of the vibration sensor 300 faster and easier.

In some embodiments, the thickness of the second limiter 3122 along the vibration direction of the vibration unit 213 may be equal to the height of the first acoustic cavity 214 along the vibration direction of the vibration unit 213. In this arrangement, when preparing the vibration receiver 210, the thickness of the second limiter 3122 along the vibration direction of the vibration unit 213 may be set according to a height requirement of the first acoustic cavity 214 along the vibration direction of the vibration unit 213, such that the control of the height of the first acoustic cavity 214 along the vibration direction of the vibration unit 213 may be more precise. In some embodiments, the thickness of the second limiter 3122 along the vibration direction of the vibration unit 213 may be in a range of 50 um-500 um. For example, the thickness of the second limiter 3122 along the vibration direction of the vibration unit 213 may be in a range of 150 um-400 um. As another example, the thickness of the second limiter 3122 along the vibration direction of the vibration unit 213 may be in a range of 250 um-300 um.

In some embodiments, the width of the first limiter 3121 along the direction perpendicular to the vibration direction of the vibration unit 213 and the width of the second limiter 3122 along the direction perpendicular to the vibration direction of the vibration unit 213 may be the same or different. In some embodiments, the width of the first limiter 3121 along the direction perpendicular to the vibration direction of the vibration unit 213 may be less than the width of the second limiter 3122 along the direction perpendicular to the vibration direction of the vibration unit 213, such that the elastic element 2132 may be arranged between the limiter 3121 and the mass element 2131. For example, by setting the width of the first limiter 3121 along the direction perpendicular to the vibration direction of the vibration unit 213 to be smaller than the width of the second limiter 3122 along the direction perpendicular to the vibration direction of the vibration unit 213, the elastic element 2132 may be bonded between the first limiter 3121 and the mass element 2131 more conveniently. In some embodiments, a ratio of the width of the first limiter 3121 along the direction perpendicular to the vibration direction of the vibration unit 213 to the width of the second limiter 3122 along the direction perpendicular to the vibration direction of the vibration unit 213 may be greater than 0.5. When the overall size of the vibration sensor 300 is fixed, the smaller the width of the first limiter 3121 along the direction perpendicular to the vibration direction of the vibration unit 213, the larger the width of the mass element 2131 along the direction perpendicular to the vibration direction of the vibration unit 213, and the sensitivity of the vibration sensor 300 may be improved. On the other hand, by setting a larger width of the first limiter 3121 along the direction perpendicular to the vibration direction of the vibration unit 213, the overall strength of the limiter 312 may be improved to a certain extent.

In some embodiments, the widths of the first limiter 3121 and/or the second limiter 3122 along the direction perpendicular to the vibration direction of the vibration unit 213 may be in a range of 100 um-500 um. For example, the width of the first limiter 3121 along the direction perpendicular to the vibration direction of the vibration unit 213 may be in a range of 100 um-250 um. The width of the second limiter 3122 along the direction perpendicular to the vibration direction of the vibration unit 213 may be in a range of 200 um-500 um.

In some embodiments, the width of the first limiter 3121 along the direction perpendicular to the vibration direction of the vibration unit 213 may be less than the width of the second limiter 3122 along the direction perpendicular to the vibration direction of the vibration unit 213.

In some embodiments, the material of the first limiter 3121 and the material of the second limiter 3122 may be the same. In some embodiments, the material of the first limiter 3121 and the material of the second limiter 3122 may be a rigid material. For example, the material of the first limiter 3121 and the material of the second limiter 3122 may be a metal material (e.g., a brass), an alloy material (e.g., a stainless steel), a rigid plastic, or the like. The first limiter 3121 and the second limiter 3122 may be made of the same material to simplify the production process of the vibration sensor 300.

In some embodiments, the material of the first limiter 3121 and the material of the second limiter 3122 may be different. For example, the first limiter 3121 may be made of the rigid material (e.g., the metal material, the alloy material, the rigid plastic). The second limiter 3122 may be made of a solder paste or a glue. In the preparation process of the vibration sensor 300, firstly, the housing 211 may be connected to the first limiter 3121. Then the housing 211 and the first limiter 3121 may be directly connected (e.g., glued) to the substrate 221 through the second limiter 3122, such that the preparation process of the vibration sensor 300 may be more convenient. In addition, by connecting the first limiter 3121 to the substrate 221 directly through the second limiter 3122, a connection strength between the vibration receiver 210 and the substrate 221 may be improved, and the structural reliability of the vibration sensor 300 may be improved.

It should be noted that the above descriptions about the vibration sensor 300 and its components are only for illustration, and do not limit the scope of the present disclosure. For those skilled in the art, various modifications and changes may be made to the vibration sensor 300 under the guidance of the present disclosure, and these modifications and changes are still within the scope of the present disclosure. For example, the limiter 312 of the vibration sensor 300 may include multiple limiters (e.g., four limiters, five limiters). The material of each limiter, the width of the each limiter along the direction perpendicular to the vibration direction of the vibration unit 213, and the thickness of the each limiter along the vibration direction of the vibration unit 213 may be the same or different.

Figure 4:
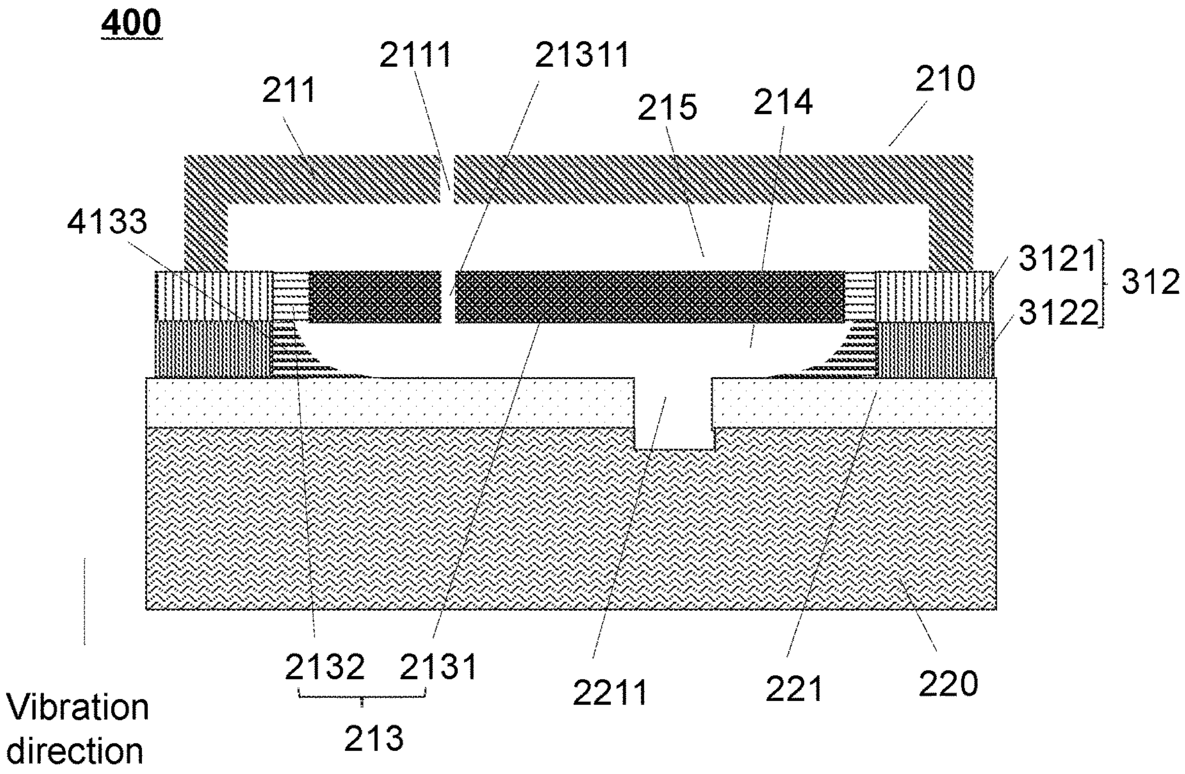
FIG. 4 is an exemplary structure diagram of a vibration sensor according to some embodiments of the present disclosure.

FIG. 4 is an exemplary structure diagram of a vibration sensor according to some embodiments of the present disclosure.

The structure of the vibration sensor 400 shown in FIG. 4 may be similar to the structure of the vibration sensor 300 shown in FIG. 3, the different may be that the structure of the vibration unit is different. As shown in FIG. 4, the vibration unit 213 of a vibration sensor 400 may further include a second elastic element 4133. The second elastic element 4133 may be located in the first acoustic cavity 214. The second elastic element 4133 may be connected with the second limiter 3122 and the substrate 221 of the acoustic transducer 220, respectively. By arranging the second elastic element 4133 in the first acoustic cavity 214, a volume of the first acoustic cavity 214 may be reduced, thereby improving the performance (e.g., the sensitivity) of the vibration sensor 400. For example, by reducing the volume of the first acoustic cavity 214, the volume change rate of the first acoustic cavity 214 caused by the same displacement of the vibration unit 213 may be higher, and the change of the air pressure in the first acoustic cavity 214 may be larger, thereby improving the sensitivity of the vibration sensor 400.

In some embodiments, the second elastic member 4133 may be in contact with an elastic member 2132. In some embodiments, the second elastic element 4133 may not be in contact with the elastic element 2132, that is, the second elastic element 4133 may be separated from the elastic element 2132 by a certain distance. In some embodiments, the material of the second elastic element 4133 and the material of the elastic element 2132 may be the same or different. In some embodiments, the material of the elastic element 2132 and/or the material of the second elastic element 4133 may include an elastic colloid, for example, a silicon rubber, a silicon gel, a silicon sealant, a silicone glue, or the like.

In some embodiments, the second elastic element 4133 may not be in contact with the mass element 2131, thereby avoiding the function damage of the vibration sensor 400 caused by the influence of the second elastic element 4133 on the mass element 2131 during the vibration process of the mass element 2131. For example, there may be a certain distance between the second elastic element 4133 and the mass element 2131 along the vibration direction of the vibration unit 213. The distance may be greater than a maximum vibration amplitude generated when the mass element 2131 vibrates along the vibration direction of the mass element 2131.

In some embodiments, an area of the second elastic element 4133 close to the acoustic transducer 220 may be equal to an area of the second elastic element 4133 away from the acoustic transducer 220. The area of the second elastic element 4133 close to the acoustic transducer 220 may refer to a cross-sectional area of the second elastic element 4133 perpendicular to the vibration direction of the vibration unit 213. For example, a shape of a projection of the second elastic member 4133 on a plane parallel to the vibration direction of the vibration unit 213 may be a rectangle. In some embodiments, when the second elastic element 4133 is in contact with the elastic element 2132, the width of the second elastic element 4133 along the direction perpendicular to the vibration direction of the vibration unit 213 may be less than the width of the elastic element 2132 along the direction perpendicular to the vibration direction of the vibration unit 213, thereby avoiding the contact between the second elastic element 4133 and the mass element 2131.

In some embodiments, the area of the second elastic element 4133 close to the acoustic transducer 220 may be larger than the area of the second elastic element 4133 away from the acoustic transducer 220. For example, a shape of a projection of the second elastic element 4133 on the plane parallel to the vibration direction of the vibration unit 213 may be a trapezoid or a triangle. A side of the second elastic member 4133 away from the second limiter 3122 in the direction perpendicular to the vibration of the vibration unit 213 may be set as an inclined plane or an arc-shaped plane. By setting the area of the second elastic element 4133 close to the acoustic transducer 220 to be larger than the area of the second elastic element 4133 away from the acoustic transducer 220, the volume of the first acoustic cavity 214 may also be reduced while avoiding the contact between the second elastic element 4133 and the mass element 2131, thereby further improving the sensitivity of the vibration sensor 400.

It should be noted that the above descriptions about the vibration sensor 400 and its components are only for illustration and description, and do not limit the scope of the present disclosure. For those skilled in the art, various modifications and changes may be made to the vibration sensor 400 under the guidance of the present disclosure, and these modifications and changes are still within the scope of the present disclosure. For example, the limiter 312 of the vibration sensor 400 may be a single-layer limiter (e.g., the limiter 212 shown in FIG. 2).

Figure 5:
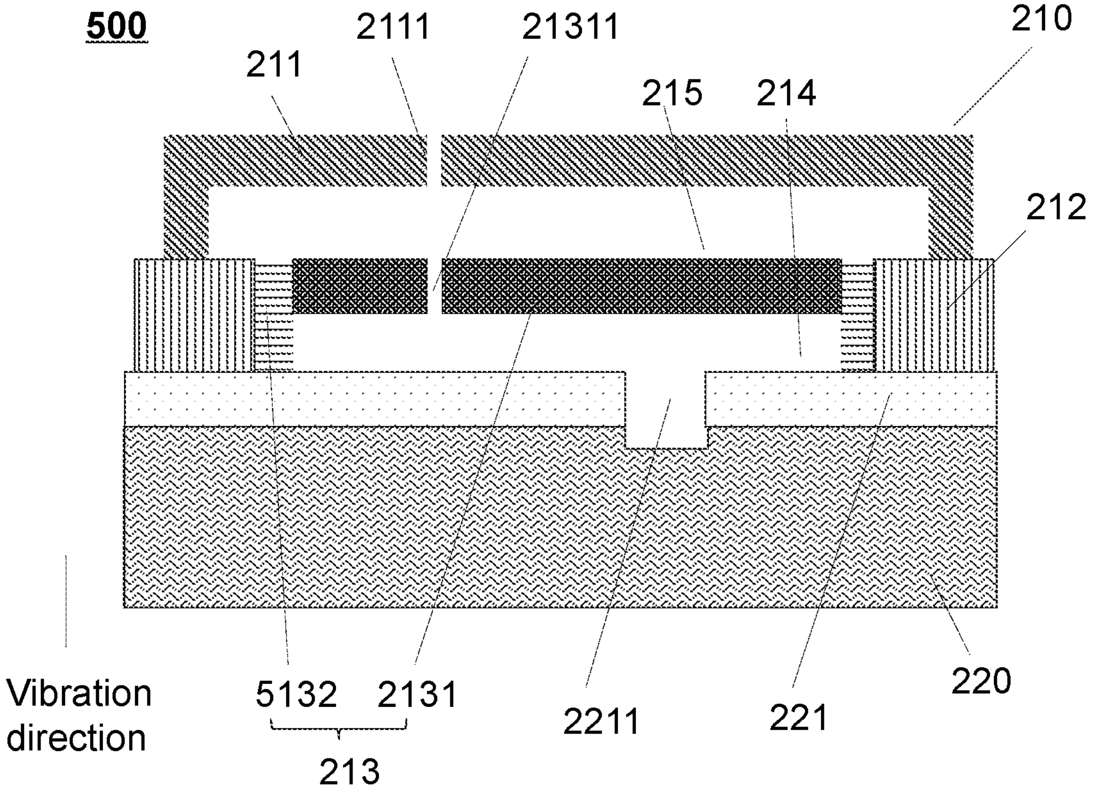
FIG. 5 is an exemplary structural diagram of a vibration sensor according to some embodiments of this specification.

FIG. 5 is an exemplary structural diagram of a vibration sensor according to some embodiments of the present disclosure.

The structure of the vibration sensor 500 shown in FIG. 5 may be similar to the structure of the vibration sensor 200 shown in FIG. 2, the difference may be that the structure of the elastic element is different.

In some embodiments, as shown in FIG. 5, an elastic element 5132 of the vibration sensor 500 may extend to the acoustic transducer 220, and may be connected with the acoustic transducer 220. For example, the elastic element 5132 may extend to the substrate 221 and may be connected with the substrate 221. The elastic element 5132, the substrate 221, and the vibration unit 213 may form the first acoustic cavity 214. By connecting the elastic element 5132 to the substrate 221 of the acoustic transducer 220, a volume of the first acoustic cavity 214 may further be reduced, thereby improving the sensitivity of the vibration sensor 500.

In some embodiments, a temperature change of the vibration receiver 210 during the preparation process may cause the elastic element 5132 to flow, causing the elastic element 5132 to penetrate into a surface (also referred to as a "lower surface") of the mass element 2131 close to the substrate 221, thereby affecting the vibration of the mass element 2131, and affecting the sensitivity of the vibration sensor 500. In some embodiments, the infiltration amount of the elastic element 5132 into the lower surface of the mass element 2131 may be controlled by controlling a total amount of materials used in the elastic element 5132 (e.g., the amount of glue). The infiltration amount may refer to an overlapping area of a projection area of the elastic element 5132 along the vibration direction of the vibration unit 213 and a projection area of the mass element 2131 along the vibration direction of the vibration unit 213. In some embodiments, the infiltration amount of the elastic element 5132 may not exceed 25% of the projection area of the mass element 2131 along the vibration direction of the vibration unit 213. For example, the infiltration amount of the elastic element 5132 may not exceed 10% of the projection area of the mass element 2131 along the vibration direction of the vibration unit 213.

It should be noted that the above descriptions about the vibration sensor 500 and its components are only for illustration and description, and do not limit the scope of the present disclosure. For those skilled in the art, various modifications and changes may be made to the vibration sensor 500 under the guidance of the present disclosure, and these modifications and changes are still within the scope of the present disclosure. In some embodiments, the limiter 212 of the vibration sensor 500 may have a double-layer structure or a multi-layer structure (e.g., the limiter 312 shown in FIG. 3). For example, the limiter 212 of the vibration sensor 500 may include a first limiter (not shown in FIG. 5) and a second limiter (not shown in FIG. 5). When the width of the first limiter and the width of the second limiter along the direction perpendicular to the vibration direction of the vibration unit 213 are different, a side of the elastic element 5132 close to the limiter 212 may be set as a step structure, such that the elastic element 5132 may be closely connected with the first limiter and the second limiter, respectively.

Figure 6:
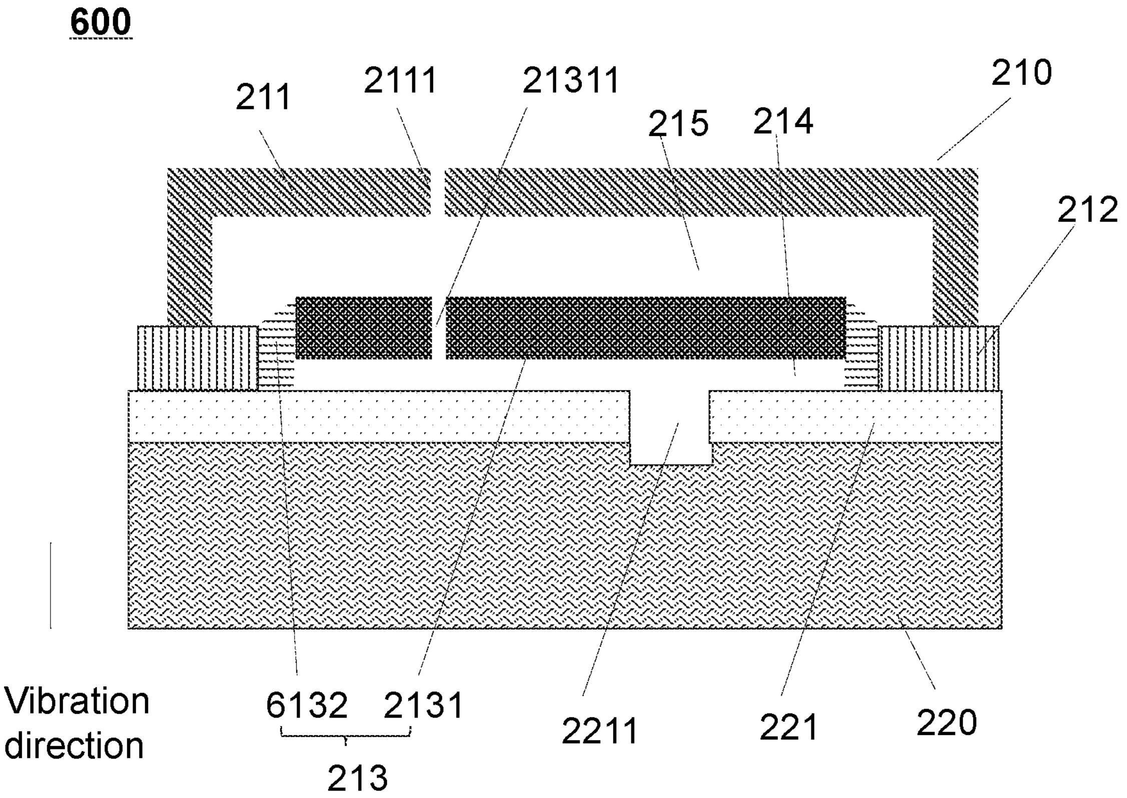
FIG. 6 is an exemplary structural diagram of a vibration sensor according to some embodiments of the present disclosure.

FIG. 6 is an exemplary structural diagram of a vibration sensor according to some embodiments of the present disclosure.

The structure of the vibration sensor 600 shown in FIG. 6 may be similar to the structure of the vibration sensor 500 shown in FIG. 5, the difference may be that the structures of the elastic element and the limiter are different.

In some embodiments, as shown in FIG. 6, a thickness of the limiter 212 along the vibration direction of the vibration unit 213 may be equal to a thickness of the mass element 2131 along the vibration direction of the vibration unit 213. In this situation, the limiter 212 and the mass element 2131 may be processed at the same time, thereby simplifying the preparation process of the limiter 212 and the mass element 2131. In some embodiments, when preparing the vibration sensor 600, firstly, the limiter 212 and the mass element 2131 may be located in a same horizontal plane (i.e., a side of the limiter 212 away from the substrate 221 may be flush with a side of the mass element 2131 away from the substrate 221). Then an elastic element 6132 may be bonded between the limiter 212 and the mass element 2131. The air in the sound pickup hole 2211 may be thermally expanded by increasing the temperature, to raise the mass element 2131, such that the side of the mass element 2131 facing away from the substrate 221 may be more distant from the substrate 221 than the side of the limiter 212 facing away from the substrate 221, and the first acoustic cavity 214 may be formed.

In some embodiments, since the elastic element 6132 has a certain deformability, the elastic element 6132 may be stretched and deformed during the preparation process of the vibration sensor 600 (e.g., the raising process of the mass element 2131), such that an area of the first side of the elastic element 6132 (the side close to the mass element 2131) may be greater than an area of the second side of the elastic element 6132 (the side away from the mass element 2131).

It should be noted that the above descriptions about the vibration sensor 600 and its components are only for illustration and description, and do not limit the scope of the present disclosure. For those skilled in the art, various modifications and changes may be made to the vibration sensor 600 under the guidance of the present disclosure, and these modifications and changes are still within the scope of the present disclosure. In some embodiments, the limiter 212 of the vibration sensor 600 may have a double-layer structure or a multi-layer structure (e.g., the limiter 312 shown in FIG. 3).

Figure 7:
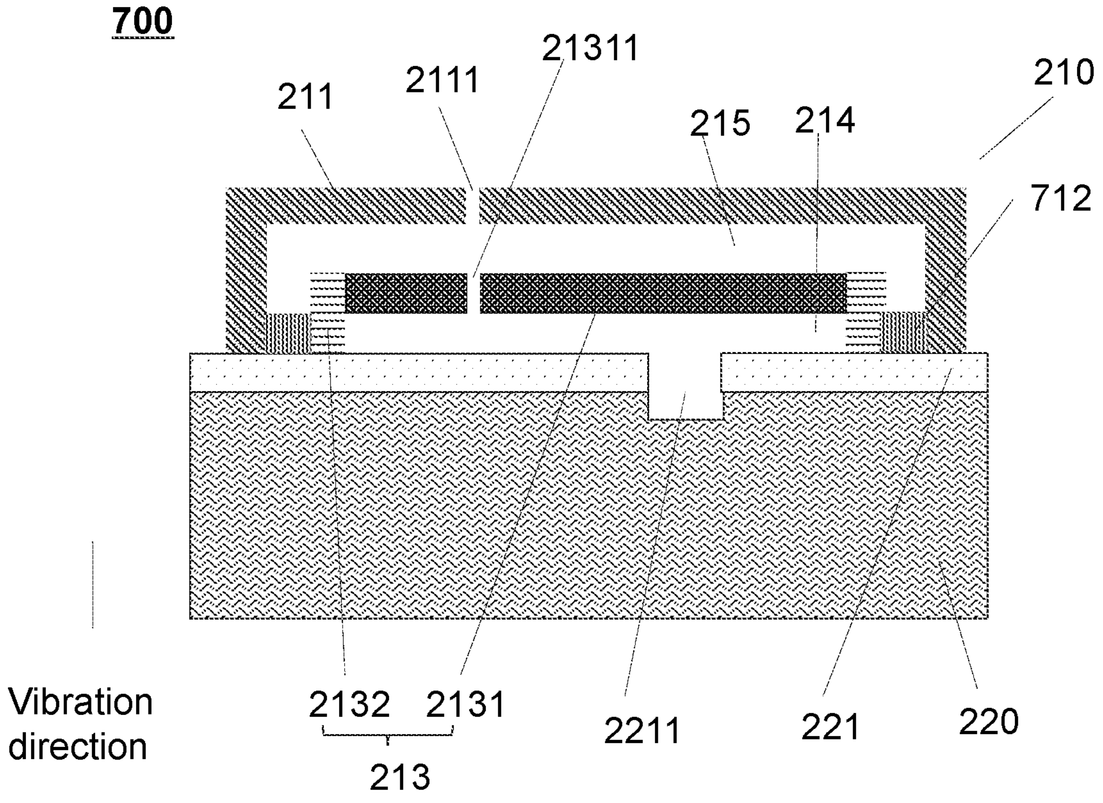
FIG. 7 is an exemplary structural diagram of a vibration sensor according to some embodiments of the present disclosure.

FIG. 7 is an exemplary structural diagram of a vibration sensor according to some embodiments of the present disclosure.

The structure of the vibration sensor 700 shown in FIG. 7 may be similar to the structure of the vibration sensor 500 shown in FIG. 5, the difference may be that the structure of the limiter is different.

In some embodiments, as shown in FIG. 7, a limiter 712 may be located between the elastic element 2132 and the housing 211. In some embodiments, the limiter 712 may be arranged around the elastic element 2132. A side of the elastic element 2132 close to the mass element 2131 may be physically connected to the mass element 2131. A side of the elastic element 2132 close to the limiter 712 may be physically connected to the limiter 712. In some embodiments, the limiter 712 may be physically connected to the substrate 221. In some embodiments, the limiter 712 may not be in contact with the housing 211. For example, the limiter 712 may be spaced from the housing 211 by a certain distance. In some embodiments, the limiter 712 may be in contact with the housing 211. In some embodiments, the elastic element 2132 may extend to the substrate 221 of the acoustic transducer 220, and may be physically connected to the substrate 221, such that the substrate 221, the elastic element 2132, and the mass element 2131 may form the first acoustic cavity 214.

In some embodiments, a thickness of the limiter 712 along the vibration direction of the vibration unit 213 may be in a range of 100 um-1000 um. For example, the thickness of the limiter 712 along the vibration direction of the vibration unit 213 may be in a range of 200 um-500 um. In some embodiments, the thickness of the limiter 712 along the vibration direction of the vibration unit 213 may be equal to the thickness of the mass element 2131 along the vibration direction of the vibration unit 213. In this situation, the limiter 712 and the mass element 2131 may be processed at the same time, thereby simplifying the preparation processes of the limiter 712 and the mass element 2131.

It should be noted that the above descriptions about the vibration sensor 700 and its components are only for illustration and description, and do not limit the scope of the present disclosure. For those skilled in the art, various modifications and changes may be made to the vibration sensor 800 under the guidance of the present disclosure. For example, the thickness of the limiter 712 along the vibration direction of the vibration unit 213 may be greater than or equal to the thickness of the elastic element 2132 along the vibration direction of the vibration unit 213.

Figure 8:
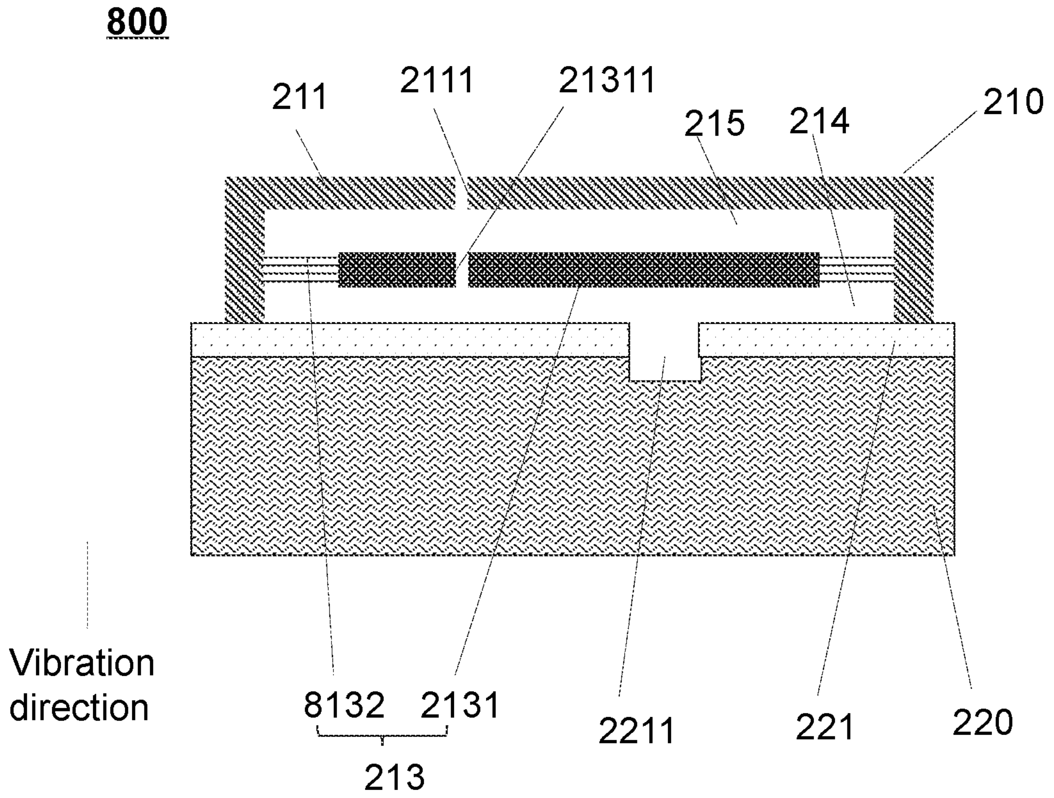
FIG. 8 is an exemplary structural diagram of a vibration sensor according to some embodiments of the present disclosure.

FIG. 8 is an exemplary structural diagram of a vibration sensor according to some embodiments of the present disclosure.

As shown in FIG. 8, the vibration sensor 800 may not include a limiter. In some embodiments, as shown in FIG. 8, an elastic element 8132 may be arranged around the mass element 2131. An inner side of the elastic element 8132 may be physically connected to the mass element 2131. An outer side of the elastic element 8132 may be physically connected to the housing 211. In some embodiments, the elastic element 8132 and the substrate 221 may be spaced at a certain distance in the vibration direction of the vibration unit 213. The elastic element 8132, the mass element 2131, the housing 211, and the substrate 221 may form the first acoustic cavity 214. The elastic element 8132, the mass element 2131, and the housing 211 may form the second acoustic cavity 215.

In some embodiments, when forming the first acoustic cavity 214 and the second acoustic cavity 215, a distance (i.e., a height of the first acoustic cavity 214) between the mass element 2131 and the substrate 211 may be controlled by a jig (not shown in FIG. 8). For example, the mass element 2131 may be placed on the jig, and the mass element 2131 may be lifted by using the height of the jig. Then the mass element 2131 may be connected with the housing 211 through the elastic element 8132, and the control of the height of the first acoustic cavity 214 and the second acoustic cavity 215 may be realized. By connecting the mass element 2131 with the housing 211 through the elastic element 8132, and adjusting the distance between the mass element 2131 and the substrate 211 using the jig, the height of the first acoustic cavity 214 and the height of the second acoustic cavity may be controlled more stably and accurately, which may simplify the preparation process of the vibration sensor 800. In addition, a structure of the mass element 2131 (e.g., whether the mass element 2131 has a hole) may not affect the above process flow.

In some embodiments, the thickness of the elastic element 8132 along the vibration direction of the vibration unit 213 may be less than, equal to, or greater than the thickness of the mass element 2131 along the vibration direction of the vibration unit 213.

Figure 9:
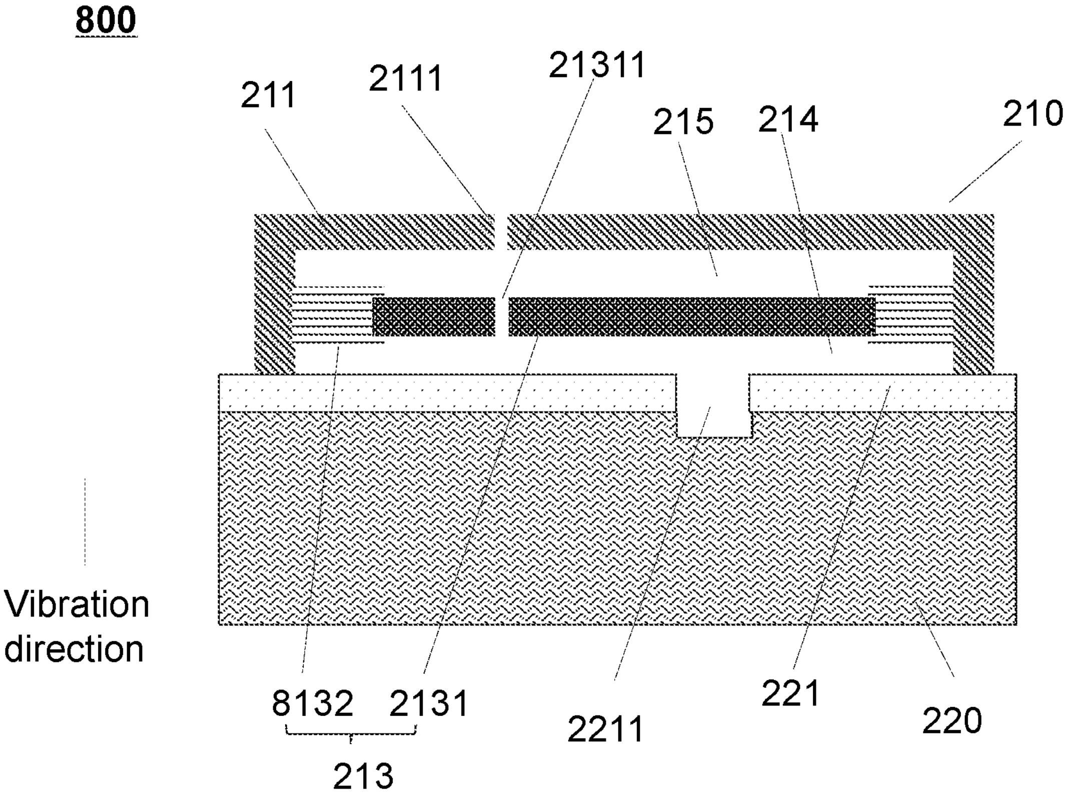
FIG. 9 is an exemplary structure diagram of a vibration sensor according to some embodiments of the present disclosure.

FIG. 9 is an exemplary structure diagram of a vibration sensor according to some embodiments of the present disclosure.

As shown in FIG. 9, in some embodiments, a thickness of an elastic element 8132 along the vibration direction of the vibration unit 213 may be greater than a thickness of the mass element 8132 along the vibration direction of the vibration unit 213. For example, two sides of the elastic member 8132 along the vibration direction of the vibration unit 213 may protrude relative to two sides of the mass member 2131 along the vibration direction of the vibration unit 213. That is, a side of the elastic element 8132 close to the substrate 211 may be closer to the substrate 211 than a side of the mass element 2131 close to the substrate 211, and a side of the elastic element 8132 away from the substrate 211 may be more distant from the substrate 21 than a side of the mass element 2131 away from the substrate 211. Such arranging may increase a connection area between the elastic element 8132 and the mass element 2131, thereby improving a connection strength between the elastic element 8132 and the mass element 2131.

It should be noted that the above descriptions about the vibration sensor 800 and its components are only for illustration and description, and do not limit the scope of the present disclosure. For those skilled in the art, various modifications and changes may be made to the vibration sensor 800 under the guidance of the present disclosure. For example, the side of the elastic element 8132 close to the substrate 211 may be closer to the substrate 211 than the side of the mass element 2131 close to the substrate 211, and the side of the elastic element 8132 away from the substrate 211 may be flush with the side of the mass element 2131 away from the substrate 211. As another example, the side of the elastic element 8132 close to the substrate 211 may be flush with the side of the mass element 2131 close to the substrate 211, and the side of the elastic element 8132 away from the substrate 211 may be more distant from the substrate 21 than the side of the mass element 2131 away from the substrate 211.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or characteristic may be combined as suitable in one or more embodiments of the present disclosure.

In addition, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, various aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present disclosure, the description, definition, and/or the use of the term in the present disclosure shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, comprising:

a vibration receiver and an acoustic transducer, wherein:

the vibration receiver includes a housing, a limiter and a vibration unit, the housing and the acoustic transducer form an acoustic cavity, the vibration unit is located in the acoustic cavity to separate the acoustic cavity into a first acoustic cavity and a second acoustic cavity, the acoustic transducer is acoustically connected to the first acoustic cavity, the housing is configured to generate a vibration based on an external vibration signal, the vibration unit changes an acoustic pressure within the first acoustic cavity in response to the vibration of the housing, such that the acoustic transducer generates an electrical signal, the vibration unit includes a mass element and a first elastic element, a first side of the first elastic element is connected around a side wall of the mass element, a second side of the first elastic element is connected with the limiter, and the vibration unit includes a second elastic element, connected with the limiter and the acoustic transducer, wherein an area of a side of the second elastic element close to the acoustic transducer is larger than an area of a side of the second elastic element away from the acoustic transducer.

2. The vibration sensor of claim 1, wherein:

the limiter is located between the housing and the acoustic transducer, and the housing, the limiter and the acoustic transducer form the acoustic cavity.

3. The vibration sensor of claim 2, wherein:

the acoustic transducer includes a substrate, the limiter is connected with the substrate, the limiter, the vibration unit, and the substrate form the first acoustic cavity, the first elastic element is connected between the limiter and the mass element, and the first elastic element and the substrate are spaced at a certain distance in a vibration direction of the vibration unit.

4. The vibration sensor of claim 3, wherein:

the first elastic element extends to the substrate and is connected with the substrate, and the first elastic element, the mass element, and the substrate form the first acoustic cavity.

5. The vibration sensor of claim 4, wherein:

a thickness of the limiter along the vibration direction of the vibration unit is equal to a thickness of the mass element along the vibration direction of the vibration unit, and an area of the first side of the first elastic element is greater than an area of the second side of the first elastic element.

6. The vibration sensor of claim 4, wherein:

a thickness of the limiter along the vibration direction of the vibration unit is equal to a thickness of the mass element along the vibration direction of the vibration unit, and a side of the mass element facing away from the substrate is more distant from the substrate than a side of the limiter facing away from the substrate.

7. The vibration sensor of claim 2, wherein:

a thickness of the limiter along a vibration direction of the vibration unit is greater than a thickness of the mass element along the vibration direction of the vibration unit, and a side of the limiter facing away from the acoustic transducer is flush with a side of the mass element facing away from the acoustic transducer.

8. The vibration sensor of claim 2, wherein:

the limiter includes a first limiter and a second limiter, the first limiter and the second limiter are sequentially arranged along a vibration direction of the vibration unit, the first limiter is connected with the housing, and the second limiter is connected with the acoustic transducer.

9. The vibration sensor of claim 8, wherein the second side of the first elastic element is connected with the first limiter.

10. The vibration sensor of claim 8, wherein a thickness of the first limiter along the vibration direction of the vibration unit is equal to a thickness of the mass element along the vibration direction of the vibration unit.

11. The vibration sensor of claim 8, wherein a width of the first limiter along a direction perpendicular to the vibration direction of the vibration unit is less than a width of the second limiter along the direction perpendicular to the vibration direction of the vibration unit.

12. The vibration sensor of claim 11, wherein a ratio of the width of the first limiter along the direction perpendicular to the vibration direction of the vibration unit to the width of the second limiter along the direction perpendicular to the vibration direction of the vibration unit is greater than 0.5.

13. The vibration sensor of claim 1, wherein the limiter is located between the first elastic element and the housing.

14. The vibration sensor of claim 1, wherein:

the first elastic element extends to the acoustic transducer and is connected with the acoustic transducer, and the first elastic element, the mass element, and the acoustic transducer form the first acoustic cavity.

15. The vibration sensor of claim 13, wherein a thickness of the limiter along a vibration direction of the vibration unit is in a range of 100 um-1000 um.

16. The vibration sensor of claim 1, wherein a width of the limiter along a direction perpendicular to a vibration direction of the vibration unit is in a range of 100 um-500 um.

17. The vibration sensor of claim 1, wherein the mass element includes a first hole portion, the first hole portion communicates with the first acoustic cavity and the second acoustic cavity.

* * * * *